MODULAR CIRCUIT BOARDS

Filed Oct. 7, 1964 3 Sheets-Sheet 1

Dec. 5, 1967 J. D. HELMS 3,356,786

MODULAR CIRCUIT BOARDS

Filed Oct. 7, 1964 3 Sheets-Sheet 2

Dec. 5, 1967 J. D. HELMS 3,356,786

MODULAR CIRCUIT BOARDS

Filed Oct. 7, 1964 3 Sheets-Sheet 3

John D. Helms,
Inventor.
Koenig, Senniger,
Powers and Leavitt,
Attorneys.

United States Patent Office 3,356,786

Patented Dec. 5, 1967

3,356,786

MODULAR CIRCUIT BOARDS

John D. Helms, Dallas, Tex., assignor to Texas Instruments Incorporated, Dallas, Tex., a corporation of Delaware Filed Oct. 7, 1964, Ser. No. 402,228
11 Claims. (Cl. 174—68.5)

This invention relates to improved modular circuit boards, and with regard to certain more specific features, to connected assemblies of such circuit boards to provide multiplanar boards for constructing complex electronic circuitry in small spaces.

Among the several objects of the invention may be noted the provision of compactly arranged modular circuit boards and multiplanar assemblies thereof to provide dense conductor routings in small spaces; the provision of such boards which provide for a large number of selections for such routings; and the provision of circuit boards of this class wherein said routings may be brought about by convenient manual or automatic operations, and which during assembly of a multiplanar board may be inspected for reliability in each of its planes as they are built up. Other objects and features will be in part apparent and in part pointed out hereinafter.

The invention accordingly comprises the elements and combinations of elements, steps and sequence of steps, features of construction and manipulation, and arrangements of parts which will be exemplified in the constructions and methods hereinafter described, and the scope of which will be indicated in the following claims.

In the accompanying drawings, in which several of various possible embodiments of the invention are illustrated, FIG. 1 is a fragmentary plan view of a portion of one form of an improved board component, positioned for proper assembly;

Corresponding reference characters indicate corresponding parts throughout the several views of the drawings.

One of the problems in the construction and successful operation of a multiplanar circuit board, particularly when miniaturized, as hereby provided, is conveniently to provide for a large number of selectively made interconnections between its various levels of circuitry, particularly when dense circuit conductor routings are demanded. Another problem is to provide for proper inspection at various levels during assembly of the connections between levels, so that when defects are found they can be corrected before a multiplanar board is completed. Another problem is that concerned with effectively standardizing assemblable board components to reduce costs, without sacrifice of compactness.

Hereinafter the term "insulating board" means a single-ply or multi-ply layer of a substantially tough and rigid insulating substrate material such as, for example but without limitation, an epoxy-impregnated fibreglass sheet. Its thickness is such as known in the art. The term "foil" means a thin single-ply or multi-ply conductive circuit-forming layer composed of one or more conductive materials such as for example Kovar, nickel or the like, being attached in the usual way to a board by adhesion, cohesion, plating or the like. Its thickness is such as known in the art, usually a few mils. The circuit-forming pattern of the foil may be obtained by any of the usual processes such as photoetching, imprinting, formation of a stencil or the like. The patterns described below are of new forms for carrying out the objects of the invention.

Figure 3:
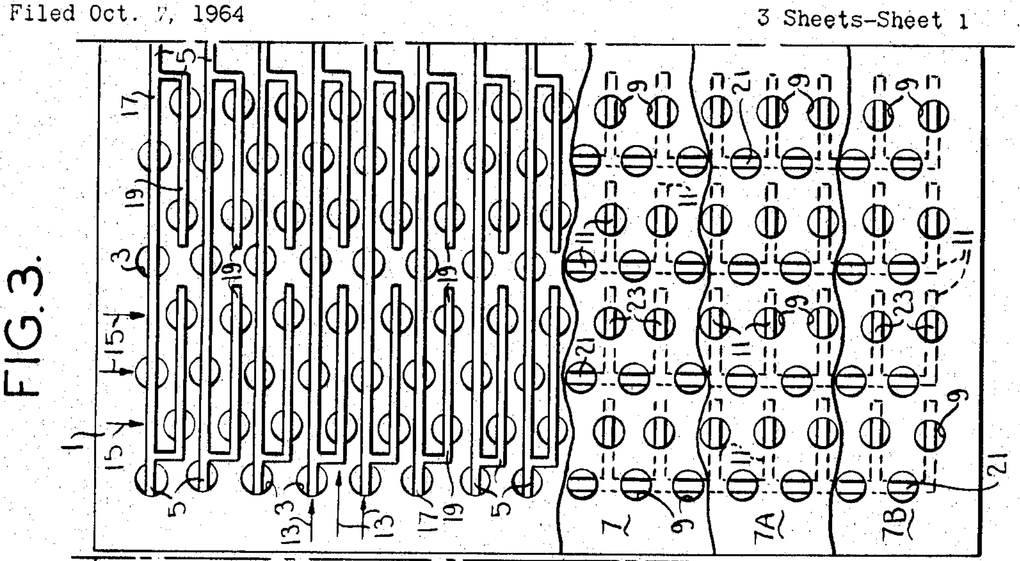
FIG. 3 is a broken plan view showing a multiplanar assembly of the board made according to FIG. 1 with three of the boards made according to FIG. 2, to provide, as an example, a stack as used for a four-layer multiplanar board, certain circuit breaks and connector pellets or pins being omitted.
Figure 2:
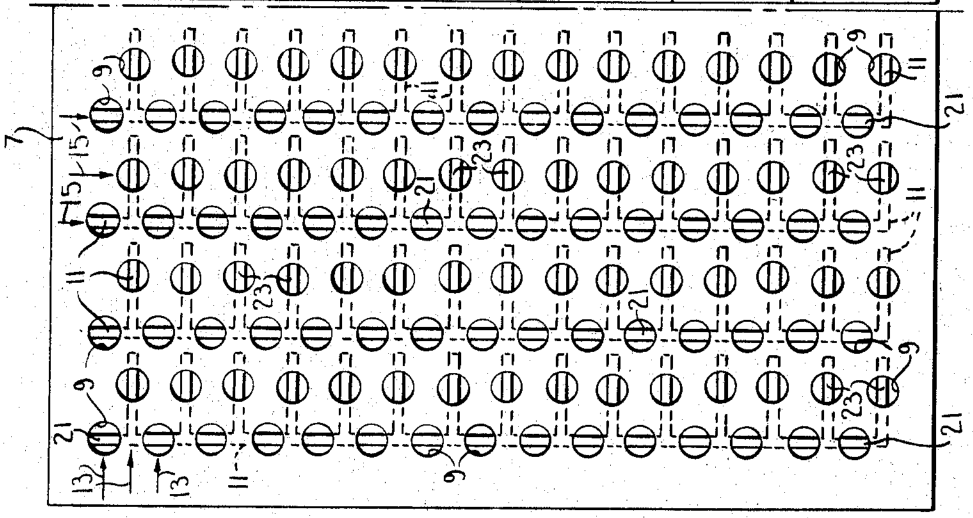
FIG. 2 is a fragmentary view similar to FIG. 1, showing a portion of another form of improved board component, also positioned for proper assembly.
Figure 1:
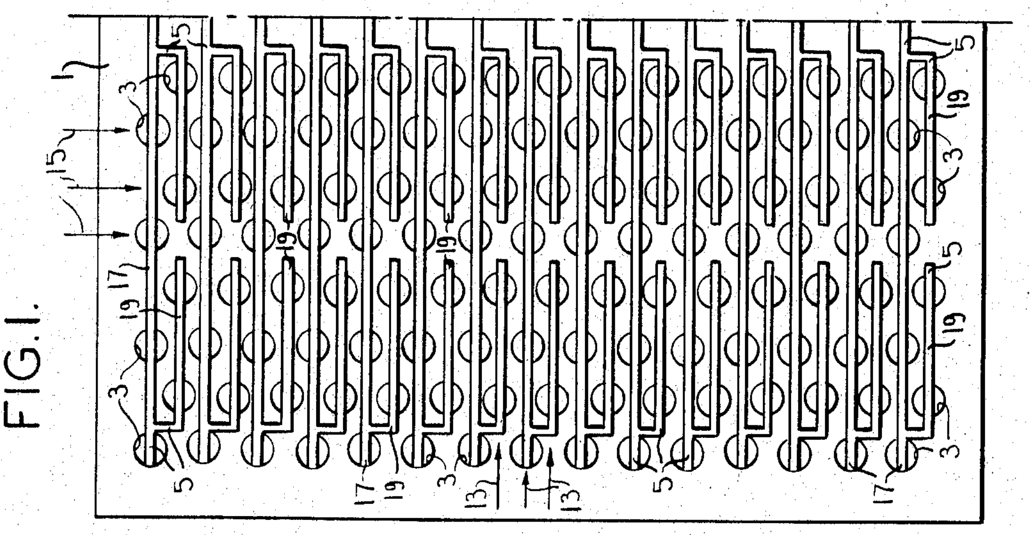
Figures 4, 5, 6, 7:
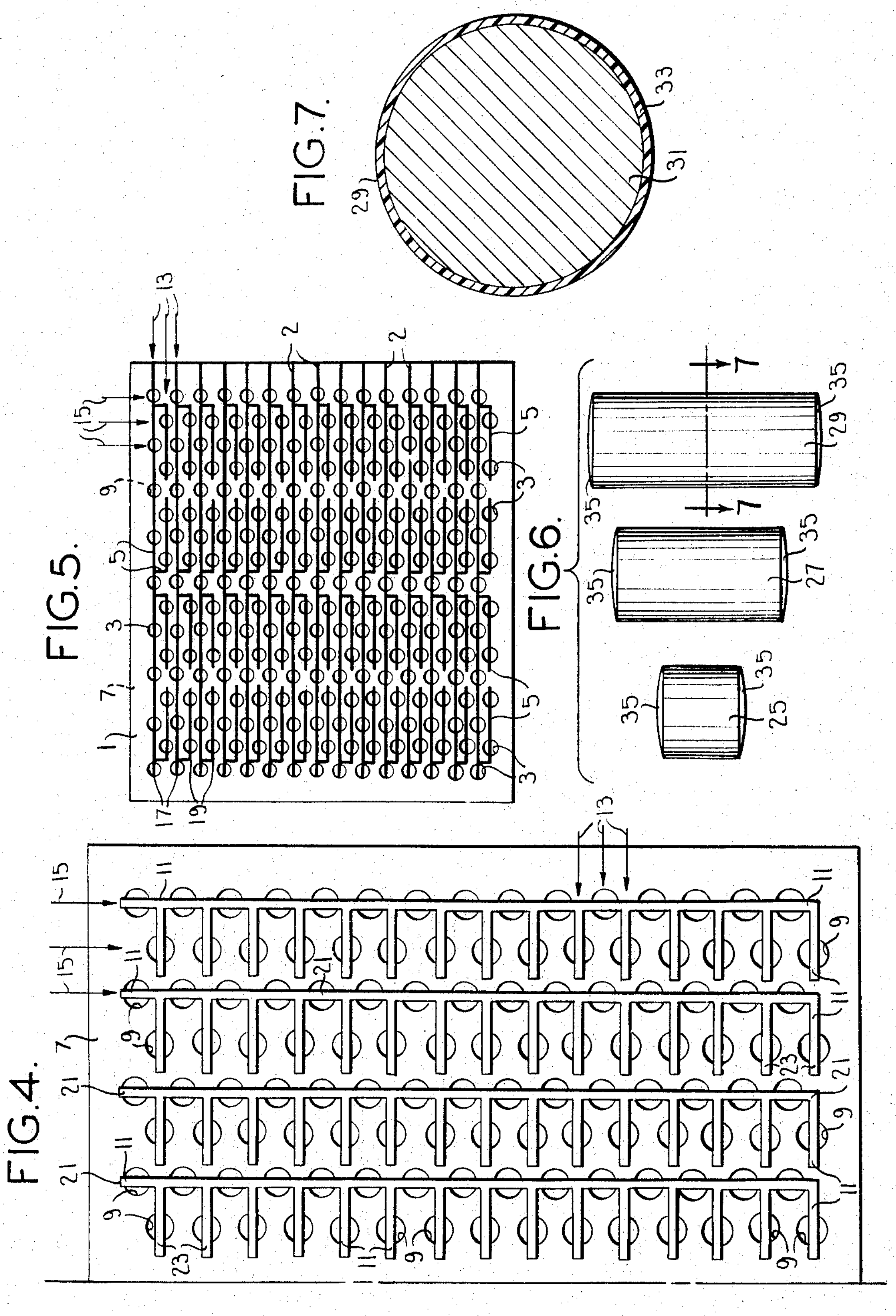
FIG. 4 is a bottom plan view of the form of board shown in FIG. 2, being turned over to the right.
FIG. 5 is a diagrammatic view of an entire area of a stack such as shown in FIG. 3.
FIG. 6 shows enlarged side elevations of a group of typical connector pellets or pins for use in a stacked assembly such as shown in FIG. 3.
FIG. 7 is a further enlarged typical cross section of the pins shown in FIG. 6, being taken as an example on line 7—7 of FIG. 6.

Referring now more particularly to FIG. 1 of the drawings, there is shown a first form of a component board 1 comprising an insulating substrate sheet. This contains an array of holes or openings 3 traversed by portions of ribbon-like patterns 5 of foil preattached to the top side of the board. The other side is bare. Referring to FIG. 2, there is shown a second form of a component board 7 also comprising an insulating substrate sheet. This also contains an array of openings 9 traversed by portions of preattached ribbon-like patterns 11 of foil attached to the underside of the board. The other sides are bare. FIG. 4 shows in solid lines the foil patterns 11. The arrays of holes 3 and 9 are so disposed as to register when a board such as 1 is stacked on a board such as 7 (FIG. 3). Additional boards 7A and 7B are shown in FIG. 3, which are identical to board 7. These in the stack successively underlie board 7, their respective patterns being on their undersides.

It will be understood that the number of boards 7, 7A, 7B is arbitrary, depending upon the number of multiplanar layers desired in a finished multiplanar board. Thus only one layer 7 may be employed, two layers 7, 7A, three layers 7, 7A, 7B, or more. It will also be understood that FIGS. 1, 2 and 3 show only portions of component boards, and that the patterns shown thereon may be multiplied indefinitely to make a multiplanar board of any desired area. This is suggested in diagrammatic FIG. 5 on a smaller scale but showing a more extended board in which the patterns have been multiplied twice. Other multiplying factors may be used to extend the sizes of the component boards 1, 7, 7A, 7B, etc., and hence the sizes of any multiplanar boards made therefrom.

The holes 3 and 9 are shown as being round, but it will be understood that other shapes may be used. They are disposed in equally spaced rows 13 and equally spaced perpendicular rows or columns 15 on both types of boards 1 and 7, 7A, 7B, etc. The arrays of holes 3 or 9, as the case may be, are arranged in rows 13 and perpendicular rows or columns 15. The holes in adjacent rows and columns are staggered. This arrangement of staggered holes in rows and columns lends itself to a very compact field of registered holes (FIG. 3) when the boards are stacked.

The patterns 5 on board 1 are of ribbon-like form, in which the width of the ribbon form is less than that of the widths of the holes. Thus if (as will appear) it is desired during assembly to remove a bridging part of a pattern over any hole for purposes to be described, this may readily be accomplished by appropriately shearing out, electrically burning out or otherwise removing the bridging part. The fact that a bridging ribbon is narrower than a hole not only facilitates removal, but favors placement of more patterns in a smaller area, noting that the widths of the holes in one row 13 overlap the widths of the holes in an adjacent row 13 for optimum compaction of the array of holes.

Each pattern 5 on the board 1 comprises a continuous strip 17 extending across the board. From strips 17 extend branches 19. These have colinear portions extending toward one another and parallel to the continuous strip 17. Each strip 17 initially bridges all of the holes in a row 13, and each of the branches 19 bridges several (in the present example two) holes in an adjacent row. All holes in the adjacent row are initially bridged. Columns of the described pattern may be repeated indefinitely, as suggested by diagrammatic FIG. 5. In FIG. 5 the heavy black lines represent the patterns 5 on board 1. This FIG. 5 also shows lateral tabs 2 for making outside connections.

Referring to FIGS. 2 and 4, it will be seen that typical boards such as 7 also have their foil pattern 11 of repeating form. Each pattern 11 is of ribbon form for bridging appropriate holes. It is narrower than the holes for the purpose above described in connection with the patterns 5. Each pattern 11 comprises a continuous strip 21 initially underlying all holes 9 in a column or row 15 in board 7. In assembly such as shown in FIG. 3, the strips 21 of patterns 11 will be located perpendicularly to the strips 17 of patterns 5. Each of the strips 21 has transversely extending branches 23 underlying holes in the rows 13. Each branch 23 underlies one hole 9 but all holes 9 are initially covered. Any strip removal is made later.

Referring now to FIG. 6, it illustrates on enlarged scale various lengths of conductor pins or pellets to be selectively used in the openings 3 and 9 to establish connections between patterns 5 and 11. Hereinafter they may be referred to as pins, regardless of length.

FIG. 6 shows various pins 25, 27 and 29, each of which has a typical cross section such as shown in FIG. 7. Each pin is composed of a conductive core 31 made of nickel, Kovar or the like, the cylindrical surface being preferably covered with insulation such as a suitable plastic, as shown at 33. The ends of the cores 31 are slightly rounded as shown at 35, where they are preferably gold-plated if they are to be welded or brazed, or with a suitable solder if they are to be soldered, as will appear. It will be understood that the insulating surfaces 33 in some cases may be omitted for reasons given below.

Figure 9:
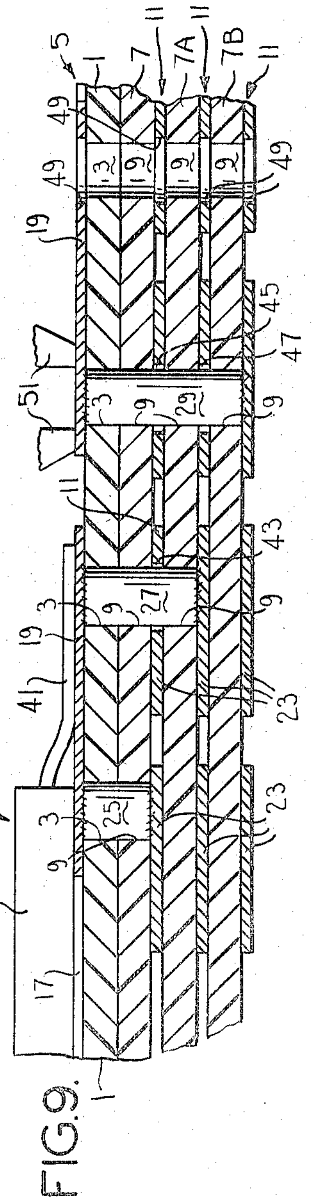
FIG. 9 is a fragmentary illustrative section of parts of a finished four-layer multiplanar board.

Each of the shortest pins such as 25 has a length such that when in registered holes of boards 1 and 7, it will, for example, connect a pattern 5 on top of the board 1 with a pattern 11 on the underside of board 7 (see FIG. 9). In the case of a pin such as 27, its greater length is designed, for example, to make a connection between a pattern 5 on top of board 1 with a pattern 11 on the underside of a board such as 7A. In the case of the longest type of pin such as 29, its still greater length is designed, for example, to make a connection between a pattern 5 on top of board 1 with a pattern 11 on the underside of board 7B. Similar pins or pellets may be inserted to make interconnections between hole-bridging portions of any two of the foils on boards 7, 7A, 7B, et cetera.

In the case of pins 27, the bridging portion of the pattern 11 on the underside of board 7 is, as shown at 43, cut away from the hole to be occupied by pin 27, thereby avoiding a connection with the pin. In the case of pins 29, bridging portions of the patterns 11 on the bottoms of boards 7 and 7A are cut away from the holes to be occupied by pin 29, thereby avoiding connections with the pin, as shown at 45 and 47. These cut-aways avoid carrying current from any pattern 11 on board 7 and 7A to or from the respective pin 29. If the removal of the bridging pattern portions is such that the pins 27 and 29 do not touch the foil patterns through which they pass, then no insulation such as 33 is required on the pins.

Before the boards 7, 7A, 7B, etc. are assembled, selected hole-bridging portions of the foil patterns 5 and 11 are removed as above described. This may be for the reception of pins, or without reception of a pin, to provide an open-circuit condition in a pattern, as needed for providing any planned circuit-routing therethrough. In FIG. 9 a typical removal of bridging portions without pin insertion is indicated for each layer at 49. For simplicity these removals are shown in alignment, but it will be understood that more usually they are not, depending upon the circuit routing desired. No removal of any such bridging portions is shown in any of the drawings except FIGS. 8 and 9 for clarity in description, nor are any inserted pins such as 25, 27 and 29 shown in any other figure except FIG. 9, for the same reason. On FIG. 8 typical removals are shown at 53 and 55 on board 1. It will be appreciated that in actual practice there may be a substantial number of pins used according to one arrangement or another in the holes 3 and 9, and that a considerable number of removals of bridging portions across the holes (without the introduction of pins) may also be effected. This is the case for all boards 1, 7, 7A, 7B, etc. and for any of the strips such as 17, 19, 21 and 23. Exactly which particular pin 25, 27, 29 is to be used in any given registered holes and what bridging portions are to be removed across any holes (with or without use of a pin) is subject to wide variation, depending upon the circuitry required. There is a wide field of choice in this regard. Examples of foil removals and pin locations have been shown only on FIGS. 8 and 9 but not in FIGS. 1–5 because the latter are intended to show intermediate board products as they are originally prepared and in general how they are layered when stacked (FIG. 3), ignoring foil removals and pin locations, which as stacking proceeds may occur at any of a multitude of locations depending upon required circuitry.

Figure 8:
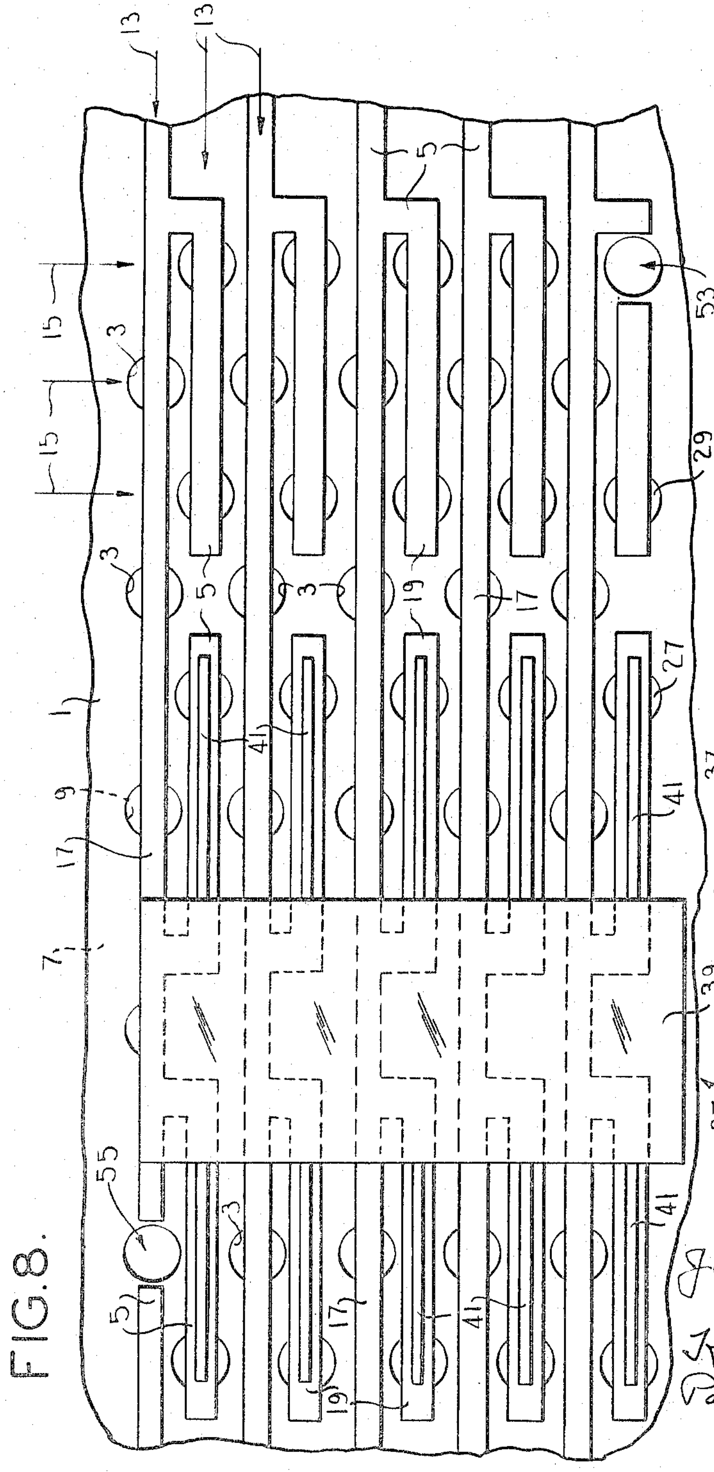
FIG. 8 is a plan view of a portion of a board such as shown in FIG. 3, illustrating the attachment of a semiconductor network.

FIGS. 8 and 9 illustrate how semiconductor networks 37 may be connected to the branches 19 of the patterns 5 on the board 1. Such known networks are quite small and have a central frame 39 containing semiconductor circuits. From opposite sides of the frame 39, terminals 41 extend in closely spaced parallel arrays. The columnar spacing of the branches 19 is also very close, so as to register with such terminals 41. When registered as in FIG. 9, the terminals 41 are welded or soldered to the branches 19. Any appropriate number of semiconductor networks such as 37 may be imposed upon and connected to the patterns 5 of board 1, only one being shown by way of example. An advantage of the forms of patterns 5 and 11 is the density that can be accommodated of rows 13 and columns 15, and of the overlying ribbons of conductive foil of the patterns. For example, pitch distances between rows and columns 13 and 15, respectively, are quite small.

Assembly is as follows (without limitation):

A board such as 7, 7A, 7B, etc., on which are located their appropriate foil patterns 5 and 11, may be stocked in quantities. They are then individually prepared by removing such hole-bridging portions of the patterns as may be required to open appropriate parts of circuits and in some cases to prepare for reception of a pin to establish appropriate circuits between boards 7, 7A, 7B, etc., as above made clear.

Next all boards 1, 7, 7A, 7B individually receive and have welded to their respective foil patterns 5 and 11 numbers of their respective pins 25, 27 or 29, as the case may be. Thus board 7B, individually and before stacking, in the example given will receive through some of its openings 9 pins such as 29. These pins 29 are then welded or soldered to the unremoved underlying portions of patterns 11 on board 7B (FIG. 9).

Likewise, another board 7A, individually and before stacking, will receive pins 27 through some unbridged openings 43. These pins 27 are welded to the appropirate underlying bridging portions of patterns 11 of this board 7A. Likewise, a board designated 7 will receive in certain of its openings pins such as 25, these being welded to the appropriate underlying bridging portions of patterns 11 of this board 7. Welds may be readily inspected at this time.

Next the boards 7, 7A and 7B, having their pins 25, 27 and 29, respectively, inserted and welded or soldered, are stacked as shown in FIG. 9. First board 7B is laid down with its upstanding pins 29 located in their selected positions. Then board 7A is laid thereon, unbridged portions such as shown at 47 being applied over the pins 29. This leaves the subassembly 7A, 7B with upstanding pins 27. Then board 7 is laid on board 7A, unbridged hole portions such as 43 and 45 accepting pins such as 27 and 29. The above leaves a subassembly 7, 7A, 7B from which extend pins 25. Then board 1 is applied and the upper ends of the pins 25, 27 and 29 welded thereto. Finally, the semiconductor networks 37 are welded to the patterns 5. The welds at the upper ends of pins 25, 27, 29 may at this time be inspected.

It will be understood that while the weldments between the pins and the foils of their respective boards have some ability to hold the boards together as a complete multiplanar assembly, it is preferred, because they may sometimes be comparatively few in number, that as the boards are stacked, a suitable bonding layer of epoxy resin of the like shall be employed between them, as is the usual practice. This is so thin as not to appear in FIG. 9.

Welding, brazing and soldering have been mentioned above as alternatives for making the conductive connections between the ends of the pins 25, 27, 29 and the appropriate patterns 5 and 11. These are all known as metallurgical bonds. To weld, braze or solder, a pair of current-carrying electrodes may be applied as shown at 51 (FIG. 9).

From the above the advantages of the invention will be apparent. Summarizing, in the first place, boards such as 1 on the one hand and identical boards 7, 7A, 7B, etc. on the other hand may be prepared in quantities and carried in stock. These include their respective complete foil patterns 5 and 11 covering all holes such as 3 and 9. To make up a multiplanar board, circuit openings in the patterns 5 and 11 of the boards are easily made at appropriate holes 3 or 9, as the case may be, by removal of bridged portions at such holes. The appropriate pins 25, 27 and 29 are at this time also inserted and welded into the individual boards. These welds are inspected. It will be noted in this connection that a board such as 7B receives the longest type of pin such as 29; board 7A receives intermediate lengths of pins such as 27; and board 7 receives the shortest form of pin 25. If any additional board such as 7, 7A, 7B were to be used, it would receive still longer pins. The number of additional boards that may be used is indefinite, each only requiring progressively longer pins. Removal of bridging portions and applications of pins may be accomplished in any desired order and the operations programmed manually or automatically. Assembly of board 7, 7A, 7B, etc. may also be manually or automatically programmed. The same is true of application of the semiconductor networks 37 on boards such as 1.

The high density of the circuitry that may be obtained by means of the invention will be apparent from the following and FIG. 5. Approximate, although not limiting, dimensions are as follows, for example: thickness of the conductive pattern-forming foils, on the order of .003 inch; diameters of the holes 3 and 9, on the order of ⅛ inch; diameters of the pins such as 25, 27, 29, slightly less than the hole diameters; width of the ribbon-like forms of the foils, on the order of 1/64 inch; thickness of the insulating boards, on the order of 1/32 inch; pitch distance between columns 15 of holes, on the order of 3/16 inch; and pitch distance between rows 13 of holes, on the order of 3/32 inch.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A multiplanar circuit board assembly comprising at least three insulating boards joined as a stack having registered fields of holes therethrough, one of which boards in one order in the stack carries one form of patterns of conductive material on one face and bridging some but not all of its holes, each of the other boards carrying on one face in reverse order in the stack another form of patterns of conductive material and bridging some but not all of its holes, and discrete conductor pins of various lengths in various sets of the registered holes and bonded to and electrically bridging portions of two of said patterns.

2. An intermediate circuit board comprising an insulating laminate, said laminate having an array of holes extending therethrough for the selective reception in at least some of the holes of discrete conductor pieces, said holes being disposed according to repetitive geometric groupings, and a number of duplicate patterns of conductive material attached to one face of the laminate and thereby insulated from one another, all of the holes of each grouping being bridged by a pattern for conductive attachment thereto of such conductor pieces as may be located in any of the holes bridged by said pattern, each of said groupings of holes comprising at least two adjacent rows of holes, the holes in said rows being in staggered relationship to one another, each of said patterns comprising a continuous strip bridging all the holes in one of the rows, said strip having branches each of which bridges at least one hole in an adjacent row.

3. A multiplanar circuit board component comprising a pair of individual laminate components each constructed as set forth in claim 2 and joined at faces which do not carry said patterns, wherein their holes register by pairs and each strip of each pattern of one component extends substantially perpendicularly to each strip of each pattern on the other component, and conductor pieces in at least some of the registered pairs of openings.

4. A multiplanar circuit board component according to claim 3, wherein the branches from the strips on the laminate components have portions extending substantially parallel to one another.

5. A multiplanar circuit board component according to claim 4, wherein said branch portions of the patterns in one component lie in planes passing through the branch portions of the patterns of the other component.

6. An intermediate circuit board product comprising an insulating laminate, said laminate having an array of holes extending therethrough for the selective reception in at least some of the holes of discrete conductor pieces, said holes being disposed according to repetitive geometric groupings, and a number of duplicate patterns of conductive material attached to one face of the laminate and thereby insulated from one another, all of the holes of each grouping being bridged by a pattern for conductive attachment thereto of such conductor pieces as may be located in any of the holes bridged by said pattern, wherein each of said groupings of holes comprises at least two adjacent rows of holes, the holes in said rows being in staggered relationship to one another, each of said patterns comprising a continuous strip bridging all of the holes in one of said rows, said strip having branches each of which bridges several holes in an adjacent row.

7. An intermediate circuit board product comprising an insulating laminate, said laminate having an array of holes extending therethrough for the selective reception in at least some of the holes of discrete conductor pieces, said holes being disposed according to repetitive geometric groupings, and a number of duplicate patterns of conductive material attached to one face of the laminate and thereby insulated from one another, all of the holes of each grouping being bridged by a pattern for conductive attachment thereto of such conductor pieces as may be located in any of the holes bridged by said pattern, each of said groupings of holes comprising at least two adjacent rows of holes, the holes in said rows being in staggered relationship to one another, each of said patterns comprising a continuous strip bridging all the holes in one of said rows, said strip having branches each of which bridges two holes in an adjacent row.

8. A component according to claim 7, wherein the branches are arranged in pairs, branches extending toward one another.

9. An intermediate circuit board product comprising an insulating laminate, said laminate having an array of holes extending therethrough for the selective reception in at least some of the holes of discrete conductor pieces, said holes being disposed according to repetitive geometric groupings, and a number of duplicate patterns of conductive material attached to one face of the laminate and thereby insulated from one another, all of the holes of each grouping being bridged by a pattern for conductive attachment thereto of such conductor pieces as may be located in any of the holes bridged by said pattern, each of said groupings of holes comprising at least two adjacent rows of holes, the holes in said rows being in staggered relationship to one another, each of said patterns comprising a strip bridging all of the holes in one of the rows, said strip having branches each of which bridges one hole in an adjacent row.

10. A component according to claim 9, wherein said branches extend perpendicularly to said strip between holes of the rows which the strip bridges.

11. A multilayer electric circuit board comprising a first, second and at least one additional insulating layer forming a stack, the layers having aligned perforations, each board also having a bare face and at least one preattached and segmented conductive pattern on its other face, some segmentations of each pattern being located to form openings between certain of the registered perforations, each preattached pattern on each board crossing certain perforations in that board, the conductive pattern on the first board having at least one conductor network attached to at least one segmented pattern thereon, the bare faces of the first and second boards being in engagement in the stack, the bare face of each remaining board in a stack engaging the preattached pattern on an adjacent board, and conductive means extending through various registered openings and connecting segmented patterns on various pairs of the boards.

References Cited

UNITED STATES PATENTS

| | | | |
|---|---|---|---|
| 2,734,150 | 2/1956 | Beck | 174—68.5 |
| 3,038,105 | 6/1962 | Brownfield | 174—68.5 |
| 3,077,511 | 2/1963 | Boherer et al. | 174—68.5 |
| 3,098,951 | 7/1963 | Ayer et al. | 174—68.5 |
| 3,264,524 | 8/1966 | Dahlgren et al. | 174—68.5 |

DARRELL L. CLAY, *Primary Examiner.*

UNITED STATES PATENT OFFICE

CERTIFICATE OF CORRECTION

Patent No. 3,356,786 December 5, 1967

John D. Helms

It is hereby certified that error appears in the above numbered patent requiring correction and that the said Letters Patent should read as corrected below.

Column 6, line 47, for "openings." read -- openings, said conductor pieces being conductively connected with at least some of the patterns. --.

Signed and sealed this 7th day of January 1969.

(SEAL)
Attest:

Edward M. Fletcher, Jr.
Attesting Officer

EDWARD J. BRENNER
Commissioner of Patents